No. 867,256. PATENTED OCT. 1, 1907.
L. DION.
SUBAQUEOUS LIGHT SYSTEM.
APPLICATION FILED NOV. 6, 1906. RENEWED JULY 10, 1907.

2 SHEETS—SHEET 1.

Witnesses
C. H. Walker,
J. T. Walker

Inventor
Léon Dion
By A. W. Harrison
Attorney

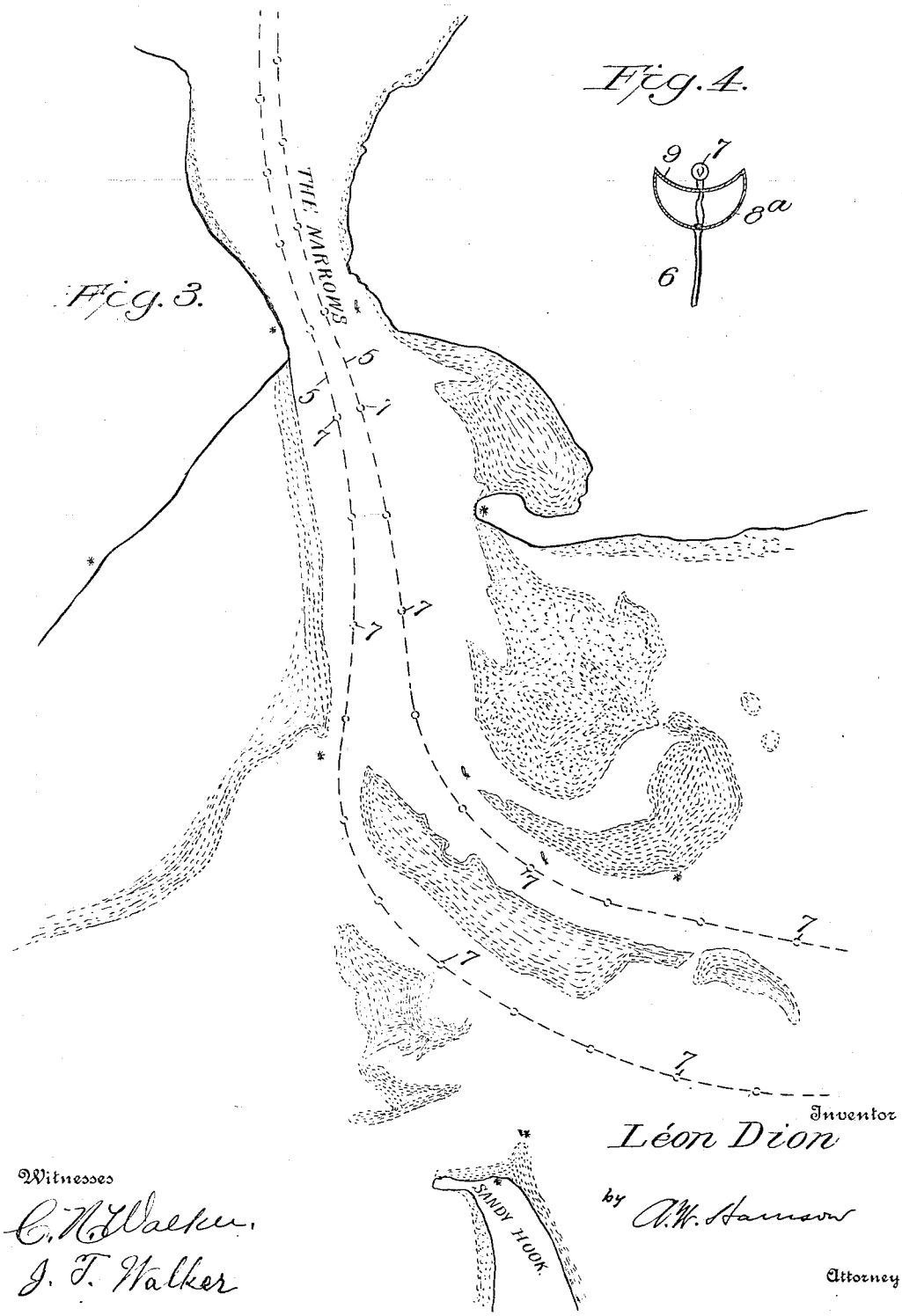

UNITED STATES PATENT OFFICE.

LÉON DION, OF WILKES-BARRE, PENNSYLVANIA, ASSIGNOR TO DION SUBMARINE LIGHT COMPANY, OF WILKES-BARRE, PENNSYLVANIA, A CORPORATION OF ARIZONA TERRITORY.

SUBAQUEOUS LIGHT SYSTEM.

No. 867,256.      Specification of Letters Patent.      Patented Oct. 1, 1907.

Application filed November 6, 1906, Serial No. 342,222. Renewed July 10, 1907. Serial No. 383,115.

*To all whom it may concern:*

Be it known that I, LÉON DION, a citizen of the United States, residing at Wilkes-Barre, in the county of Luzerne and State of Pennsylvania, have invented certain new and useful Improvements in Subaqueous Light Systems, of which the following is a specification.

This invention relates to navigation and has for its object to enable vessels to travel at a greater speed accompanied by all necessary safety, than has heretofore been practicable, particularly at night or when there is a fog, and also particularly where the channel or course to be followed is narrow or tortuous. Even on clear nights, and with ample light houses and light buoys, extreme care is required to properly traverse narrow and tortuous channels, because it is difficult to accurately estimate distances between lights on or above the surface of the water. And in foggy weather lights above the surface are useless, and it is unsafe to depend upon sound signals.

My invention contemplates the illumination of the channel or course below the surface of the water, the means of illumination being sufficiently far below the surface of the water so that said means will not be injured or displaced by passing vessels. In other words I illuminate the roadway or path or course for vessels to take, the means of illumination being located where the light therefrom can be seen with proper appliances even in the densest fogs.
My invention consists in illuminating the course which a vessel is to take, the source of illumination being below the surface of the water, all as will be more fully hereinafter described.

Figure 1:
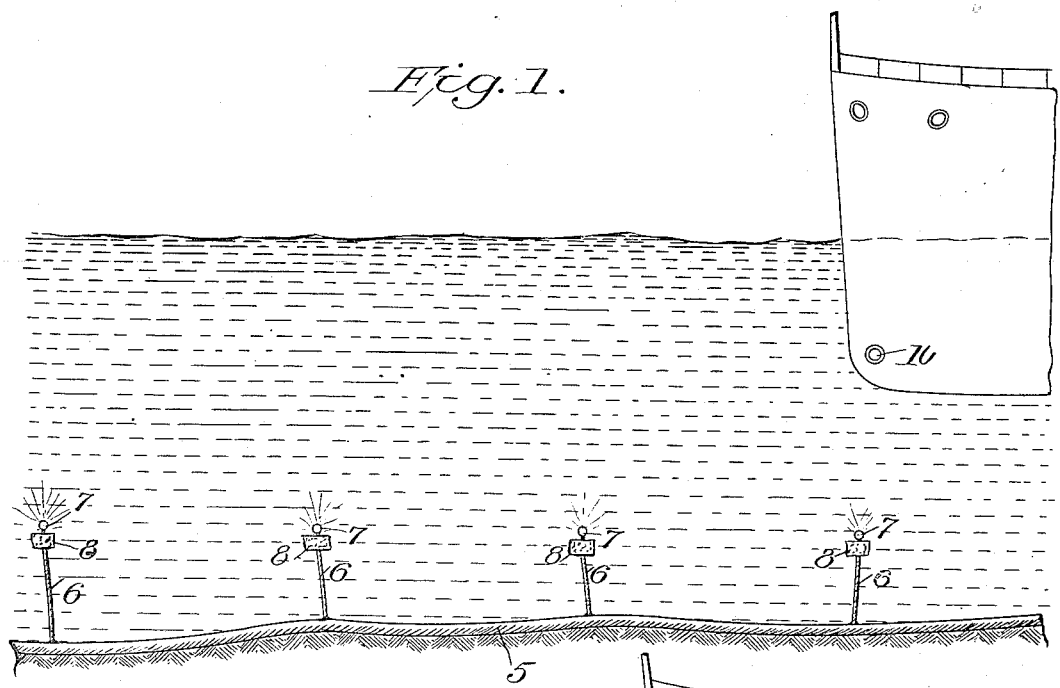
Figure 2:
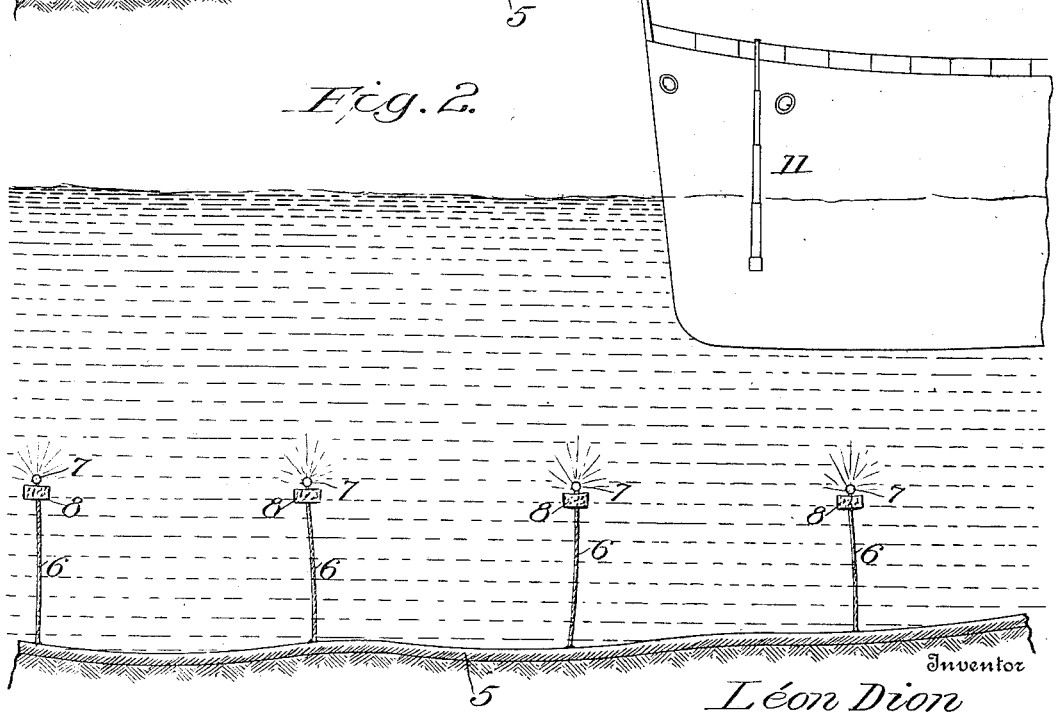

Of the accompanying drawings:—Figure 1 is a view representing somewhat conventionally a body of water and a portion of a vessel, with the course for that vessel to follow indicated by a row of incandescent lights connected with a submerged cable. Fig. 2 is a similar view but with the vessel shown as provided with a different means for observing the illuminated course during a fog. Fig. 3 is a chart view representing a portion of the entrance to New York harbor, provided with my improved course illuminators, said view representing two courses, one for incoming vessels and one for outgoing vessels. Fig. 4 is a detail view hereinafter described.

Similar reference characters indicate the same or similar parts in all of the views.

In carrying out my invention, I lay along the bottom of the course a cable 5 which may be suitably anchored in position if found necessary. Said cable will be laid along the deepest portion of the channel for vessels when the invention is used in harbors. At suitable intervals there are attached to said cable short cables 6 for conductors leading to incandescent lamps
7. In order that said lamps may not rest upon the bottom, I preferably employ suitable floats 8 which floats may be of cork or other suitable buoyant material, such as represented in Figs. 1 and 2, or they may be hollow floats such as indicated at $8^a$ in Fig. 4. I preferably employ a reflecting surface below each lamp so constructed as to direct rays of light upward. Said reflecting surface may comprise the upper concave surface 9 of the float $8^a$ shown in Fig. 4. In practice the globes of the lamps may be much thicker than usual so that they may possess the necessary strength, and they may be protected by any suitable cage structures. In any event, I prefer that the lights themselves shall not be rigidly secured in any way, but be free to sway from side to side so that th y may give or yield to swirling currents caused by the screws of large vessels passing over them. In other words, while the line of cable itself may be anchored or kept in fixed position by its weight, the lights themselves float above the cable. Of course, where the depth varies the length of the connections 6 may vary so that the lights themselves will be at a practically uniform distance from the surface of the water, such distances being preferably only sufficient to avoid their being injured by vessels of the deepest draft utilizing the harbor or channel or course where the lights are located.

The lights for one course may be colored differently from the lights of another course so that vessels utilizing the pathway may know which line to follow. If the course is shallow, the lights will be located at only sufficient height above the bottom to avoid being buried by sediment settling in the water. The distances apart of the lights will be according to requirement. If the lights are arranged quite closely together, and the night is perfectly clear, the outlook or pilot on the deck or the bridge or in the pilot house will see for a considerable distance ahead of him a luminous track which he is to follow. The continuity of said track will depend upon the proximity of the lights to each other.

The cable will, of course, be capable of being taken up for repairs or for the placing of new lights. The current for the lamps may be conveniently controlled from the closest light house or some point on land, at which point any of the current indicators now in use may be employed to determine whether the line is in working order. By placing an interrupter in the circuit so that the lighting will be intermittent, there would be no liability of a pilot mistaking the course for a streak of reflected light from some other source. In other words, if the lights are turned on and off at short intervals, the course may sometimes be more clearly determined by the pilot. By switching the current from one cable to the other, and back again, when two cables are used, this intermittent effect is produced, and the current for one connected series of lamps may thus serve for both.

While in Fig. 3 I have indicated the cable or cables and the series of lamps connected thereto as of considerable length, it is to be understood that such length will depend entirely upon the demands of the particular locality where used. For instance if the channel leads between two rocks or between a rock and a small shoal, one lamp at each side might be sufficient. Or if the course lies near to a single rock, one lamp submerged near that rock might be sufficient and no more lamps submerged for a long distance or until near the next rock or shoal. And if a shoal or rock exists where for some reason a lighthouse or buoy can not be practically located, a submerged light or series of lights can be anchored adjacent to such shoal or rock so as to indicate to a passing vessel where the danger lies.

I have so far described my invention as one relied upon in clear night weather. On a foggy night the illuminated course would not be readily distinguished from the deck of the vessel. When the vessel has, or is provided with, bull's-eyes below the water line, such as indicated at 10 in Fig. 1, a lookout at this point can see the course and indicate it by any suitable means to the pilot by simply keeping his watch at such bull's-eye. The glass for such bull's eye of course will be of any required thickness and any preferred protector for such bull's-eye may be employed. When a vessel has no such bull's-eye below the water line, an ordinary water telescope such as indicated at 11 in Fig. 2 may be suspended over the side of the vessel so that the lookout can see below the surface. The principle of the water telescope is well-known and need not be described herein further than to say that with such device, a person above the water line can see much clearer to or toward the bottom of the water than without such device, even when the weather is perfectly clear. With the bull's-eye 10 or the telescope 11, navigation will be facilitated even in the case of a daytime fog. In other words, when there is a fog in the day-time the light housekeeper or other official having charge of the system will switch on the current and then any observer below the water line or using a water telescope, will be able to signal to the pilot of the vessel the proper course to follow so as to keep above or nearly above the line of lights. This latter utility will enable the invention to be of benefit to ferry lines because the courses for the boats of the line in opposite directions may be readily marked or indicated by different colored lines of illuminators along the bottom of the water course which such ferry boats are to pass.

In war time, a harbor protected by submerged torpedoes or mines will be rendered safe for the entrance or departure of a friendly vessel able to give the proper signal to the official in a fort on shore. When such official receives the proper code signal that a friendly vessel desires to pass between the mines or torpedoes, the course having previously been laid out, no matter how tortuous, by means of a submerged cable and line of lamps as described, said official will simply switch on the current. Then when the vessel has passed the danger zone of the mines or torpedoes, the current may be shut off and no vessel of the enemy would be able to pick his way among said mines or torpedoes. Of course the location of torpedoes or mines adjacent to the safety course may be indicated by lights connected in the same series with those of the safety course but differing therefrom in color as by having white lights for the course and red ones for the mines.

My invention will be found to be of particular utility for the navigator of a submarine boat, for he must go to the surface to observe buoys, lighthouses or landmarks. My submerged lights will enable him to steer a correct course as long as the series lasts and he can stay below the surface, and a single submerged light anchored to a rock will enable him to avoid that danger with ease.

Having now described my invention, although without attempting to illustrate or describe the best details of the electrician's skill, that would be utilized in practicing the invention, what I claim is:

1. The method of aiding navigation consisting in illuminating the water from a practically fixed point below the surface of said water independently of the vessel, the navigation of which is to be facilitated by said illumination.

2. The method of imparting safety to navigation, consisting in illuminating the course by a series of submerged practically fixed lights.

3. The method of imparting safety to navigation, consisting in illuminating the course by a series of submerged practically fixed lights, and observing the illuminated course from a point on the vessel below the water line.

4. As an aid to navigation, a series of permanently submerged substantially fixed lamps.

5. The combination with a series of submerged lights to indicate a marine course, of a vessel having means whereby the lights may be observed without interference by fog.

6. As a means for illuminating a marine course, a conductor of electricity laid along said course, and a series of permanently submerged electric lights buoyantly supported above said conductor.

7. The combination with a marine channel or course, of a plurality of cables and permanently submerged lamps connected to said cables, whereby the courses for incoming and outgoing vessels may be indicated.

8. The combination with a marine channel or course, of a plurality of cables and permanently submerged lamps connected to said cables whereby the courses of incoming and outgoing vessels may be indicated, the lights of one course differing in color from the lights on the adjacent course.

9. As a means for illuminating a marine course or channel, a cable having a series of permanently submerged lights connected thereto, said lights having reflectors.

In testimony whereof I have affixed my signature, in presence of two witnesses.

LÉON DION.

Witnesses:
H. JOSEPH DOYLE,
E. H. PARKINS.